(12) United States Patent
Wang et al.

(10) Patent No.: US 11,340,916 B2
(45) Date of Patent: May 24, 2022

(54) DYNAMIC PLUGIN MANAGEMENT FOR SYSTEM HEALTH

(71) Applicant: VMware, Inc., Palo Alto, CA (US)

(72) Inventors: Ziyou Wang, Beijing (CN); Donghai Han, Beijing (CN); Chaitanya Kodeboyina, Los Altos, CA (US); Wu Qi, Beijing (CN); Qiong Wang, Beijing (CN); Wenfeng Liu, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/069,132

(22) Filed: Oct. 13, 2020

(65) Prior Publication Data

US 2022/0058036 A1  Feb. 24, 2022

(30) Foreign Application Priority Data

Aug. 20, 2020 (CN) ................. PCT/CN2020/110238

(51) Int. Cl.
 *G06F 9/445* (2018.01)
 *G06Q 10/10* (2012.01)
 *G06F 8/61* (2018.01)

(52) U.S. Cl.
 CPC ............ *G06F 9/44526* (2013.01); *G06F 8/61* (2013.01); *G06Q 10/10* (2013.01)

(58) Field of Classification Search
 CPC .................................................. G06F 9/44526
 USPC ......................................................... 717/175
 See application file for complete search history.

(56) References Cited

U.S. PATENT DOCUMENTS

| 8,131,838 | B2* | 3/2012 | Bornhoevd | G06F 9/54 709/224 |
| 8,694,988 | B2* | 4/2014 | Goldman | G06F 9/44526 717/174 |
| 10,243,820 | B2* | 3/2019 | Richards | H04L 43/08 |
| 2006/0218563 | A1* | 9/2006 | Grinstein | G06F 8/20 719/328 |
| 2017/0235559 | A1* | 8/2017 | Saenz | G06F 8/65 717/171 |
| 2018/0351898 | A1* | 12/2018 | Lindeman | H04L 51/046 |

* cited by examiner

*Primary Examiner* — Evral E Bodden
(74) *Attorney, Agent, or Firm* — Patterson & Sheridan, LLP (57) ABSTRACT

The disclosure provides an approach for providing an extendable system health management framework in a network. Embodiments include receiving, by a manager, a system health plugin. Embodiments include determining, by the manager, an association between the system health plugin and a host in the network based on the host satisfying one or more conditions. Embodiments include providing, by the manager, the system health plugin to the host for installation in a system health agent on the host. Embodiments include receiving, by the manager, from the host, status information for the system health plugin.

20 Claims, 4 Drawing Sheets

DYNAMIC PLUGIN MANAGEMENT FOR SYSTEM HEALTH

CROSS-REFERENCE TO RELATED APPLICATION(S)

This application claims benefit of and priority to International Application No. PCT/CN2020/110238, filed Aug. 20, 2020, which is hereby assigned to the assignee hereof and hereby expressly incorporated by reference herein in its entirety as if fully set forth below and for all applicable purposes.

BACKGROUND

Software defined networking (SDN) comprises a plurality of hosts in communication over a physical network infrastructure, each host having one or more virtualized endpoints such as virtual machines (VMs), containers, or other virtual computing instances (VCIs) that are connected to logical overlay networks that may span multiple hosts and are decoupled from the underlying physical network infrastructure. Though certain aspects are discussed herein with respect to VMs, it should be noted that they may similarly be applicable to other suitable VCIs.

For example, any arbitrary set of VMs in a datacenter may be placed in communication across a logical Layer 2 network by connecting them to a logical switch. Each logical switch corresponds to a virtual network identifier (VNI), meaning each logical Layer 2 network can be identified by a VNI. The logical switch is collectively implemented by at least one virtual switch on each host that has a VM connected to the logical switch. The virtual switch on each host operates as a managed edge switch implemented in software by the hypervisor on each host. Forwarding tables at the virtual switches instruct the host to encapsulate packets, using a virtual tunnel endpoint (VTEP) for communication from a participating VM to another VM on the logical network but on a different (destination) host. The original packet from the VM is encapsulated at the VTEP with an outer IP header addressed to the destination host using a mapping of VM IP addresses to host IP addresses. At the destination host, a second VTEP decapsulates the packet and then directs the packet to the destination VM. Logical routers extend the logical network across subnets or other network boundaries using IP routing in the logical domain. The logical router is collectively implemented by at least one virtual router on each host or a subset of hosts. Each virtual router operates as a router implemented in software by the hypervisor on the hosts.

SDN generally involves the use of a management plane (MP) and a control plane (CP). The management plane is concerned with receiving network configuration input from an administrator or orchestration automation and generating desired state data that specifies how the logical network should be implemented in the physical infrastructure. The management plane may have access to a database application for storing the network configuration input. The control plane is concerned with determining the logical overlay network topology and maintaining information about network entities such as logical switches, logical routers, endpoints, etc. The logical topology information specifying the desired state of the network is translated by the control plane into network configuration data that is then communicated to network elements of each host. The network configuration data, for example, includes forwarding table entries to populate forwarding tables at virtual switch(es) provided by the hypervisor (i.e., virtualization software) deployed on each host. An example control plane logical network controller is described in U.S. Pat. No. 9,525,647 entitled "Network Control Apparatus and Method for Creating and Modifying Logical Switching Elements," which is fully incorporated herein by reference.

"System health" information generally refers to metrics indicating performance and runtime status of modules such as systems and services in a network. SDN environments are complicated distributed systems that contain various modules running on different platforms. Monitoring system health information in an SDN data center may involve tracking various system and service data throughout the network, such as resource utilization and statistics related to services, to analyze and determine system health (e.g., to determine whether various modules in the network are performing within acceptable ranges). However, it is difficult to predict all of the metrics that will be needed, when they should be collected, and how they should be analyzed. Furthermore, because a data center deployment can span across thousands of different hosts, it is challenging to install, uninstall, and configure system health components (e.g., components that collect and analyze metric data on hosts to determine system health) on so many different hosts.

Some distributed platforms directly collect raw metrics data from all hosts and only do system health checks (e.g., analyzing metrics to determine whether components in the network are operating within acceptable ranges) from a central point (e.g., the MP). However, reporting such potentially large amounts of raw data will consume large amounts of system resources while providing minimal benefit, as many checks in a distributed system are for single hosts. Such an architecture is also difficult to extend at runtime because additional types of data may not be able to be collected from remote hosts through existing network channels. Furthermore, directly inserting multiple versions of health check logic (e.g., programmatic logic for analyzing particular metrics to determine system health) into functions that execute the health check logic (e.g., on each host or at a central point) also has its drawbacks. For example, different functions may affect each other on the host level, and it may be difficult to combine different types of data from multiple functions because no single function has all of the necessary data. Additionally, mixing system health check tasks (e.g., evaluating particular metrics according to particular conditions such as thresholds) with different types of functions can be confusing from a design and implementation perspective. Further, if additional types of health check functions are needed over time, functions are not generally extendable.

As such, there is a need in the art for improved techniques of dynamic system health management in data centers.

DETAILED DESCRIPTION

The present disclosure provides an approach for providing an extendable system health management architecture through the use of dynamically managed system health plugins. In particular, techniques described herein involve dynamic centralized management of system health plugins for system health agents running on hosts in a data center. Though certain aspects are described with respect to dynamic centralized management of system health plugins for system health agents running on hosts in a data center, certain aspects may similarly apply to dynamic centralized management of other types of plugins running on hosts in a data center.

System health check functions may be distributed across a plurality of hosts in a distributed system. In certain embodiments, an extendable system health agent runs on each host to handle system health check tasks. Since the agent runs on the same host as the entities (e.g., VCIs, services, and the like) from which health data is collected, existing techniques may be used for data collection, such as collecting command line interface (CLI) data, logs, and configuration files. The agent may collect the raw data from local function modules and execute the check functions. Unless coordination between multiple hosts is needed, most problems can be detected on the host level, and the agent may send the final status data rather than raw monitored data to higher levels, such as to the management plane. Since health check requirements may come from different sources and are continuously growing and evolving, techniques described herein utilize an extendable framework that supports different health check plugins inside the system health agent. The framework provides necessary contexts and libraries for developing different plugins. Compared with existing techniques, embodiments of the present disclosure are more extendable because they allow the agent to collect more data locally, add more alternative versions of health check logic, and provide more remediation options.

It may be difficult to install plugins on different hosts of a data center manually one host at a time. As such, a single management point is used to manage distribution and maintenance of plugins for a plurality of hosts (e.g., all hosts in a data center, a subset of hosts in a data center, etc.). Embodiments of the present disclosure involve group-based techniques for plugin management. For example, groups of hosts may be defined and plugins may be associated with groups such that a given plugin is distributed to all hosts in a given group.

For a host group, users may freely choose hosts from the data center and add them into a set. Logically, there is no limitation on what kind of hosts may belong to a specific group. However, defining a host group by choosing hosts one by one is inefficient, particularly in large data centers. Accordingly, techniques described herein allow users to define host groups using higher-level abstractions. For example, a host group may be defined to include all hosts of a certain type, all hosts with a certain tag, and/or all hosts that implement a given logical entity. Host groups may also be made up of other host groups. Users may define associations between host groups and plugins, and plugins may be distributed to hosts accordingly for installation, such as in respective system health agents on the hosts. Hosts may then report statuses of the plugins to the centralized management component (e.g., the manager), such as to indicate whether the plugins were installed correctly, how the plugins were configured, to report subsequent delta changes to plugins, and/or the like.

Plugins may be configured differently on different hosts. For example, a per-group, per-plugin profile mechanism may be utilized. From the manager, users can define different plugin profiles and apply them to different host groups. Based on the group span, different profiles will be distributed to different hosts. In some cases, the same plugin may have different configuration profiles for different hosts, and will therefore behave differently on different hosts. Plugins may also be enabled or disabled for certain host groups through the same configuration mechanism.

For security purposes, plugins may be validated by the manager using public keys and then distributed to hosts through existing secure channels via the controller. Hosts may consume plugin files directly in memory rather than storing them on disk. If a host restarts, it may retrieve the plugin files from the manager again. Transmitting all plugin files through secure channels and storing no persistent files on disk at the hosts prevents the security risk of the plugins being improperly modified or otherwise compromised on the host side.

Figure 1:
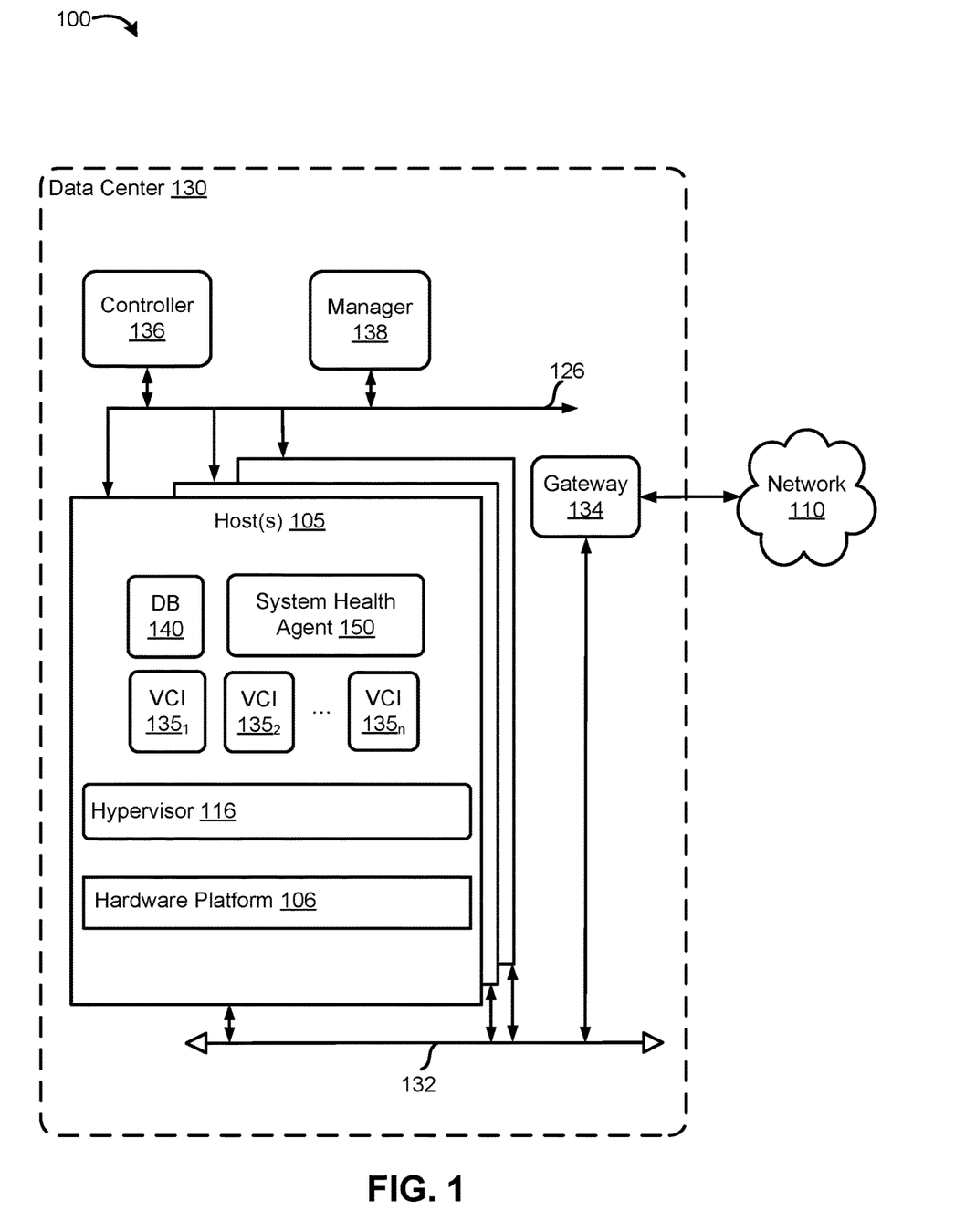
FIG. 1 depicts example physical and virtual network components with which embodiments of the present disclosure may be implemented.

FIG. 1 depicts example physical and virtual network components with which embodiments of the present disclosure may be implemented.

Networking environment 100 includes data center 130 connected to network 110. Network 110 is generally representative of a network of computing entities such as a local area network ("LAN") or a wide area network ("WAN"), a network of networks, such as the Internet, or any connection over which data may be transmitted.

Data center 130 generally represents a set of networked computing entities, and may comprise a logical overlay network. Data center 130 includes host(s) 105, a gateway 134, a data network 132, which may be a Layer 3 network, and a management network 126. Data network 132 and management network 126 may be separate physical networks or different virtual local area networks (VLANs) on the same physical network.

Each of hosts 105 may be constructed on a server grade hardware platform 106, such as an x86 architecture platform. For example, hosts 105 may be geographically co-located servers on the same rack or on different racks. Host 105 is configured to provide a virtualization layer, also referred to as a hypervisor 116, that abstracts processor, memory, storage, and networking resources of hardware platform 106 into multiple virtual computing instances (VCIs) $135_1$ to $135_n$ (collectively referred to as VCIs 135 and individually referred to as VCI 135) that run concurrently on the same host. VCIs 135 may include, for instance, VMs, containers, virtual appliances, and/or the like.

Hypervisor 116 may run in conjunction with an operating system (not shown) in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In certain aspects, hypervisor 116 implements one or more logical entities, such as logical switches, routers, etc. as one or more virtual entities such as virtual switches, routers, etc. In some implementations, hypervisor 116 may comprise system level software as well as a "Domain 0" or "Root Partition" virtual machine (not shown) which is a privileged machine that has access to the physical hardware resources of the host. In this implementation, one or more of a virtual switch, virtual router, virtual tunnel endpoint (VTEP), etc., along with hardware drivers, may reside in the privileged virtual machine. Although aspects of the disclosure are described with reference to VMs, the teachings herein also apply to other types of virtual computing instances (VCIs) or data compute nodes (DCNs), such as containers, which may be referred to as Docker containers, isolated user space instances, namespace containers, etc. In certain embodiments, VCIs 135 may be replaced with containers that run on host 105 without the use of a hypervisor.

Gateway 134 provides VCIs 135 and other components in data center 130 with connectivity to network 110, and is used to communicate with destinations external to data center 130 (not shown). Gateway 134 may be a virtual computing instance, a physical device, or a software module running within host 105.

Controller 136 generally represents a control plane that manages configuration of VCIs 135 within data center 130. Controller 136 may be a computer program that resides and executes in a central server in data center 130 or, alternatively, controller 136 may run as a virtual appliance (e.g., a VM) in one of hosts 105. Although shown as a single unit, it should be understood that controller 136 may be implemented as a distributed or clustered system. That is, controller 136 may include multiple servers or virtual computing instances that implement controller functions. Controller 136 is associated with one or more virtual and/or physical central processing units (CPUs) (not shown). Processor(s) resources allotted or assigned to controller 136 may be unique to controller 136, or may be shared with other components of data center 130. Controller 136 communicates with hosts 105 via management network 126.

Manager 138 represents a management plane comprising one or more computing devices responsible for receiving logical network configuration inputs, such as from a network administrator, defining one or more endpoints (e.g., VCIs and/or containers) and the connections between the endpoints, as well as rules governing communications between various endpoints. In one embodiment, manager 138 is a computer program that executes in a central server in networking environment 100, or alternatively, manager 138 may run in a VM, e.g. in one of hosts 105. Manager 138 is configured to receive inputs from an administrator or other entity, e.g., via a web interface or API, and carry out administrative tasks for data center 130, including centralized network management and providing an aggregated system view for a user.

According to embodiments of the present disclosure, manger 138 performs operations related to centralized management of system health plugins in an extendable system health architecture. For example, manager 138 may receive system health plugins from a user. Manager 138 may also receive host group definitions and associations between host groups and system health plugins from the user. Manager 138 may distribute the system health plugins to hosts based on the associations, and the system health plugins may be installed in a respective system health agent 150 on each of the hosts according to techniques described herein. Manger 138 may also receive status information from the hosts regarding the system health plugins. In some embodiments, manager 138 ensures that plugins are properly installed on applicable hosts over time. For example, if membership of a host group changes (e.g., due to various network configuration changes) or if an association between a plugin and a host group changes, manager 138 may remove plugins from hosts and/or distribute plugins to additional hosts accordingly.

Host 105 includes a database (DB) 140 that serves as an interface between manager 138 and system health agent 150. In some embodiments manager 138 distributes information via controller 136 to host 105, and the information is received by DB 140, which then provides the information to system health agent 150. Likewise, system health agent 150 may provide information to DB 140, and DB 140 may transmit the information to manager 138 via controller 136. In some embodiments, a local control plane of host 105 also facilitates communication between components of host 105, such as DB 140, and controller 136.

System health agent 150 comprises an extendable component for performing operations related to system health management on a given host 105. System health agent 150 provides a framework to handle common tasks for various health check tasks, such as data collection, sending alarms, reporting statuses, and retrieving profiles. Using these common functions, different system health plugins may be developed without requiring developers to re-implement common logic. The extendible framework of system health agent 150 is described in more detail below with respect to FIG. 2.

Figure 2:
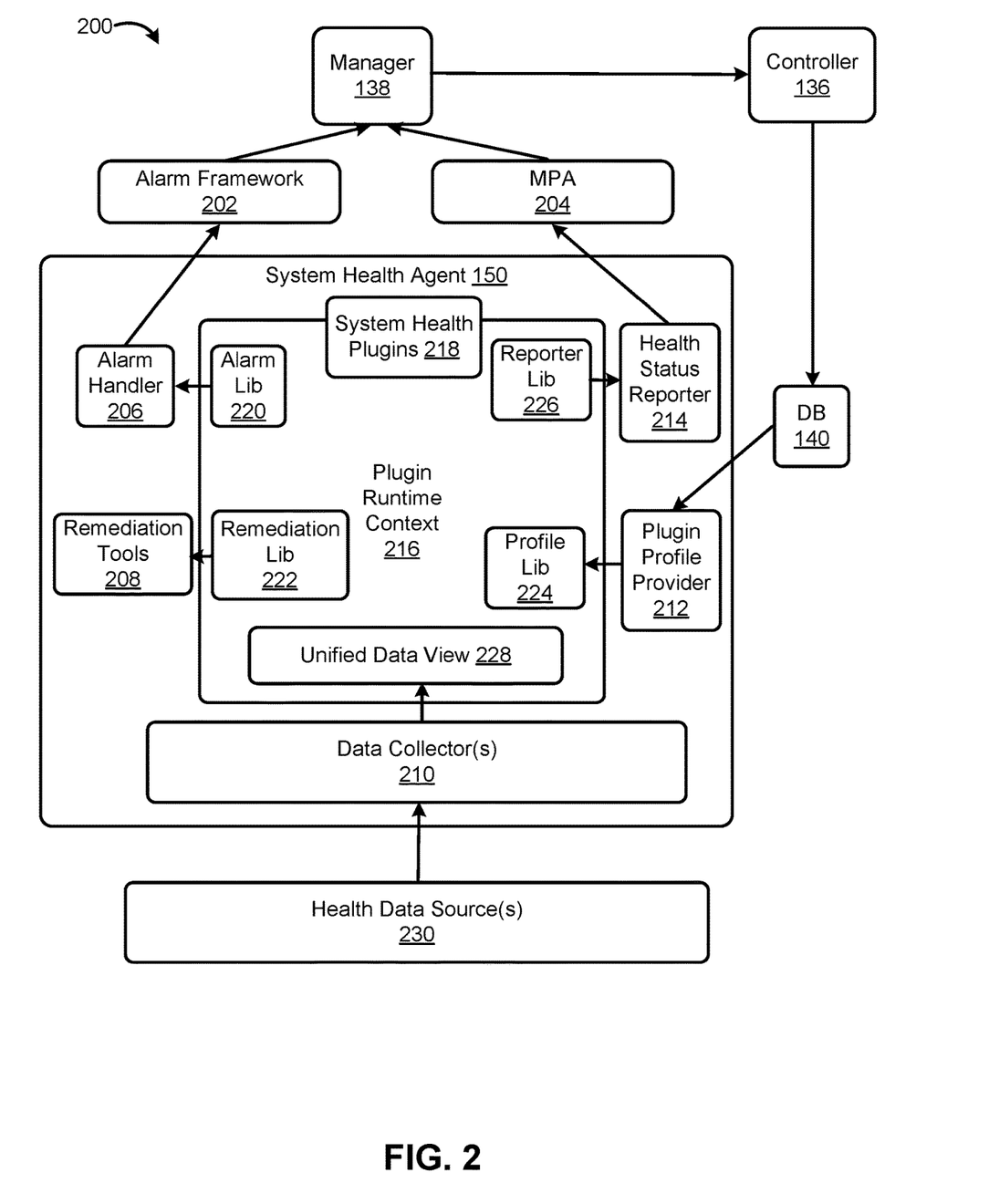
FIG. 2 depicts an example extendable system health management architecture according to embodiments of the present disclosure.

FIG. 2 depicts an example extendable system health management architecture 200 according to embodiments of the present disclosure. Architecture 200 depicts aspects of system health agent 150, DB 140, controller 136, and manager 138 of FIG. 1.

System health agent 150 includes one or more data collectors 210 (e.g., threads that pull data) that collect raw data related to system health from various health data sources 230. Health data sources 230 may include, for example, logs, configuration files, other metric collection components, and the like. Since different functions have been developed for different consumers and protocols, system health agent 150 provides different collectors to aggregate metric data from different sources. Thus, the differences between various data sources (e.g., protocols, connections, and the like) may be hidden from consumers of the data, and a unified data view 228 may be provided for system health plugins. For some types of metric data that are not monitored by any existing data exporter, collectors may be provided within system health agent to monitor these types of metric data for plugins.

Unified data view 228 serves as a single source of collected metric data, and different plugins may register with unified data view 228 to receive certain types of data without needing to directly access the original sources or collectors of the data. In some embodiments, unified data view 228 caches some historical data in memory so that plugins may retrieve backward-looking data.

System health agent 150 includes various common components and libraries that may be utilized by plugins to perform common functionality. Alarm handler 206 provides alarm functionality, using alarm libraries 220, for triggering alarms and sending notifications to manager 138 via an alarm framework 202 of the host. For example alarm handler 206 may allow alarm functionality to be abstracted away from individual plugins. Alarms may, for instance, be generated when certain conditions are met in system health data, such as when a particular metric exceeds a threshold. System health plugins 218 may utilize methods provided by alarm libraries 220 to utilize alarm functionality.

Remediation tools 208 provide remediation functionality via remediation libraries 222. Remediation may include known and common ways to recover the system from an unhealthy status. For example, if a service continually consumes excessive amounts of memory, it may indicate that the service has memory leak issues. Remediation logic may restart the service to avoid the known memory problem. This kind of remediation logic can be provided as common libraries, and plugins can use them to perform remediation tasks for their own purposes.

Health status reporter 214 provides reporting functionality via reporter libraries 226. Status information generated by plugins should be properly reported to manager 138. However, it may not be feasible for plugin developers to implement logic for reporting data through existing channels. Complex issues, such as connection management and flow control, may be handled by the common framework provided via reporter libraries 226. Health status reporter 214 reports information to manager 138 via a management plane agent (MPA) 204 on the host.

Plugin profile provider 212 provides profile functionality via profile libraries 224. System health plugins are configurable at runtime. For the same plugin, users may provide different profiles for different host groups. For example, hosts that support critical workloads may be more sensitive to resource usage to avoid potential downtime. In this case, users may want to configure more aggressive profiles. The system provides a per-group, per-plugin profile mechanism. From the manager, users can define different plugin profiles and apply them to different host groups. Based on the group span, different profiles may be distributed by manager 138 to different hosts' DB 140. System health agent 150 may monitor the profiles from the local DB 140 and deliver them to system health plugins 218 as appropriate.

System health plugins 218 run in a plugin runtime context 216 within system health agent 150. Plugin runtime context 216 provides a runtime environment for system health plugins 218, including libraries such as alarm libraries 220, remediation libraries 222, reporter libraries 226, and profile libraries 224. System health plugins 218 are distributed by manager 138 via controller 136 to hosts for installation in system health agents 150 on the hosts. In some embodiments, host groups are used to associate plugins with hosts.

Users may define host groups in a variety of ways, such as via a host type based expression. Some users may prefer to install and configure all hosts of the same type. As such, a group may be defined with a simple expression, such as type=bare metal. Similarly, it is also possible to use simple logical expressions, such as type=bare metal OR KVM (e.g., kernel based virtual machine), type=all hosts EXCLUDE edge hosts, and the like to define a group.

Furthermore, tagging may be used by administrators to attach user level information to each host. For example, administrators may add tags to certain hosts to indicate that they belong to certain business units. If customized tags are set for hosts, the tags may be used in defining host groups. For example, hosts may have tags like "CPBU" (e.g., cloud platform business unit), "NSBU" (e.g., networking and security business unit), or "EUC" (e.g., end user computing). As such, logical expressions may be used to freely combine hosts with or without tags into a host group. For example, the expression Tags="CPBU" OR "NSBU" may be used to include all hosts that belong to those two business units.

Furthermore, SDN data centers may include various logical network entities, such as logical switches, logical routers, logical ports, and the like. Although the plugins may be managed at the physical host level, it is also useful to bridge the logical concept with the physical concept for group definition purposes. For example, when a logical switch has connectivity issues, users may want to install a new health check plugin on all hosts that implement this logical switch. In this case, it may be difficult for users to determine which hosts should be included in the group because the span calculation may not be transparent to the user. Accordingly, techniques described herein allow for the use of expressions such as LS=ls-1 AND LR=lr-1 to define a host group that includes all hosts implementing a logical switch ls-1 and a logical router lr-1.

Users may also use existing groups as fundamental building blocks to construct additional groups. In one example, a user may select all bare metal hosts from a base group which has tag "NSBU", such as using the expression type=bare metal AND tags="NSBU".

In order to ensure security for installation of system health plugins 218, manager 138 may validate a system health plugin 138 using a public key, and may transmit validated system health plugins 218 to hosts via secure channels, such as via the central control plane and the local control planes on hosts. Many commercial products will validate a plugin by verifying its signature. However, since some SDN hosts may be associated with different providers, installing public keys on those hosts may require manual effort to perform signature verification using existing techniques. As such, to avoid this manual work, embodiments of the present disclosure involve verifying the plugins at the centralized point of manager 138. When a signed plugin is uploaded to manager 138, manager 138 can use the public key it has to verify the signature and confirm that the signed plugin is valid. Subsequently, the files of the plugin can be pushed through the secure channels between manager 138 and controller 136 and between controller 136 and each host. On the host side, the files of the plugin may not be stored on disk and, instead, may only be consumed directly in memory. If a host is restarted, it will retrieve the plugin files from manager 138 again. Since all of the files are published through secure channels and no persistent files are stored on disk at the hosts, security risks are minimized.

After validating a plugin, manager 138 then determines on which hosts in the data center the plugin should be installed. Because some data centers include hybrid platforms and a plugin may only be developed for one kind of platform, certain techniques involve including platform restriction information in the plugin content such that only certain hosts can activate the plugin. In other embodiments, a more fine-grained approach involves the use of host groups. Users can define host groups as described herein and link a plugin to one or more host groups. Then, controller 136 will calculate the span of each host group (i.e., determine which hosts are included in the host group) and only push plugins to relevant hosts. After the plugin is pushed down, the hosts can activate the plugins directly. Similarly, when hosts are removed from a group or when a group is disassociated with a plugin, the plugin will be deactivated and uninstalled from all related hosts. Thus, users can install or uninstall plugins efficiently without directly interacting with each host in the data center.

In some embodiments, a user may intend for the same plugin to behave differently on different hosts. This is enabled by the dynamic configuration mechanism described herein. Each plugin may have a default configuration, but the default configuration may not fit all of the different use cases to which the plugin may be applicable. Reinstalling different plugin versions just to change the configuration may be problematic because it may introduce too many different plugins with similar functions. Furthermore, some common configuration functions, such as enabling and disabling plugins and changing probe intervals, do not need to be implemented separately by each plugin. Hence, plugins should be configurable after they are deployed.

In some embodiments, users may provide different profiles for different host groups for a given plugin so that the given plugin can be dynamically configured for a given host based on the applicable profile. From manager 138, users can define different plugin profiles and apply them to different host groups.

It is possible that multiple profiles for the same plugin may be pushed down from manager 138 to a single host (e.g., if the host is part of multiple host groups). To resolve this conflict, in some embodiments, the host may use the profile with the latest date. If the profile with the latest date is removed, such as when a given host is removed from a given host group, the given host may move on to use the next available profile. If all customized profiles are removed, a plugin may utilize its default profile.

A customized profile may specify certain configuration values with which the plugin should be configured when it is installed on hosts belonging to a certain host group. For example, a developer may wish a plugin to utilize different forms of encryption or different communication protocols or techniques on different types of hosts, and customized profiles may indicate these different configuration values.

Manager 138 may also track the realization status of each system health plugin 218 that has been distributed to a host. Each host may report statuses of one or more plugins it installs and the profiles each plugin is using to manager 138. As this status information is not likely to change frequently, a host may only need to push this information when delta changes occur. Users can then choose to query a single host to check if a plugin is properly installed and configured without directly accessing the host.

The organization of a health check plugin 218 is described in more detail below with respect to FIG. 3.

Figure 3:
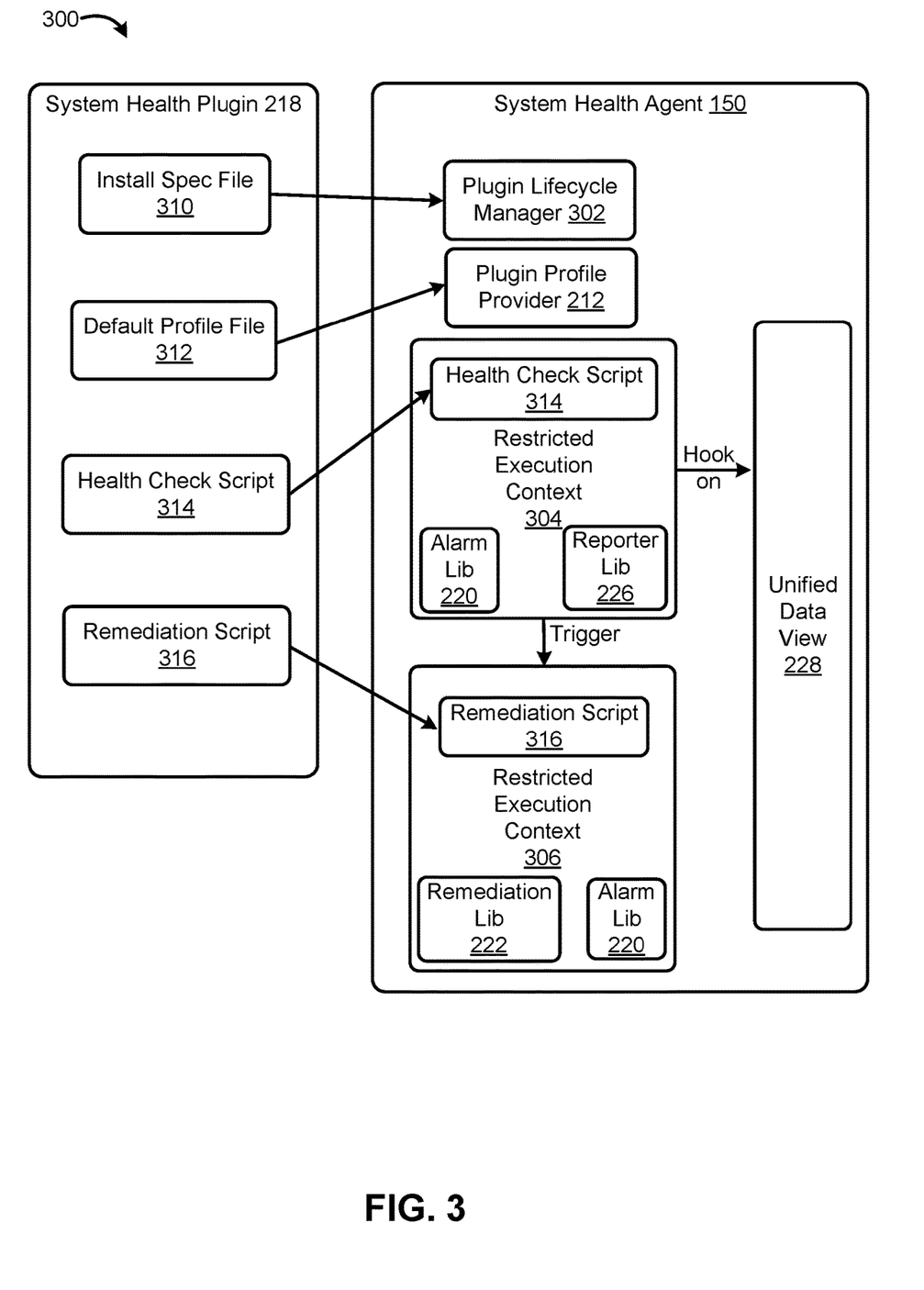
FIG. 3 depicts an example of a system health plugin according to embodiments of the present disclosure.

FIG. 3 is an illustration 300 of a system health plugin according to embodiments of the present disclosure.

In certain embodiments, a system health plugin 218 is organized and delivered to a host as a single archive file (e.g., zip file) that contains all necessary files for installing and using the plugin. Utilizing a single archive file facilitates straightforward plugin validation and delivery. For validation, to guarantee that only trusted plugins can be installed, the archive file may follow predefined architecture standards, and may be signed by a private key. Each system health agent 150 can be provided by manager 138 of FIG. 1 with a public key to validate all plugins. Inside the archive file, a system health plugin 218 may contain a plurality of files.

An install specification file 310 allows system health agent 150 to understand the plugin file structure and constraints, and provides information about how to install and use the plugin. In some embodiments, install specification file 310 contains a global unique identifier and specifies necessary information about the health check script 314 and the remediation script 316 of the system health plugin 218. For example, install specification file 310 may indicate a condition or frequency of executing health check script 314 and any conditions under which a remediation script 316 should be triggered automatically. In certain embodiments, install specification file 310 also contains necessary security restrictions for health check script 314 and remediation script 316. For example, install specification file 310 may specify the files and/or commands that these scripts can access, as well as the types of permissions (e.g., read only, modification privileges, and the like) these scripts have with respect files and/or commands. A restricted execution context 304 can use this information from install specification file 310 to provide different contexts (e.g., environments comprising memory space for variables and functions and the like) for different plugins. Install specification file 320 may be utilized by a plugin lifecycle manager 302 in system health agent 150 to install system health plugin 218.

Default profile file 312 is used to configure behaviors of system health plugin 218. By default, a common profile file should be published with each system health plugin 218 to be automatically applied when the plugin is installed. Plugin profile provider 212 of system health agent 150 utilizes common profile functions to apply default profile file 312 to system health plugin 218 upon installation. Users have the ability to override the default profile later through manager 138, which can provide a customized profile to system health agent 150 via controller 136 of FIG. 1 and DB 140 of FIG. 2.

Software development kit (SDK) libraries are provided by system health agent 150 for use in developing and debugging plugins, providing necessary common support functions. These libraries, such as alarm libraries 220, reporter libraries 226, and remediation libraries 222, are used for hooking onto monitored metrics available in unified data view 228, calling command line interfaces (CLIs), processing log files, performing unit/integration testing, and the like. For security purposed, a plugin may be prevented from installing its own third-parity modules at runtime, relying instead upon the common libraries provided system health agent 150.

Plugin developers may provide expectations on amounts of resources that will be consumed by their plugins. For example, a plugin developer may provide an indication of an amount of memory that is expected be consumed and how long remediation script 316 will last on each run. This information from the plugin developer may be included in install specification file 310. System health agent 150 may use this information to determine whether a script is in a healthy state. If a script is suspected to be in an abnormal status, system health agent 150 may kill the script and disable the plugin to avoid potential problems. When a defect in a plugin is found, it can be easily fixed and replaced at runtime by installing a new version of the plugin.

In one example, system health plugin 218 is installed into system health agent 150 by plugin lifecycle manager 302 based on install specification file 310. Plugin profile provider 212 then applies the default profile indicated in default profile file 312 to the installed system health plugin 218. Health check script 314 is then loaded into a restricted execution context 304 that enforces any permission limitations of health check script 314, such as by preventing access or modification to files and/or commands based on permission requirements indicated in install specification file 310. Health check script 314 may utilize libraries such as alarm libraries 220 and reporter libraries 226 that are loaded into restricted execution context 304. Health check script 314 hooks on to one or more particular metrics provided by unified data view 228, such as a specific health metric that is monitored by health check script 314. In one example, health check script 314 monitors memory utilization of a VCI.

If an abnormal condition is detected by health check script 314 (e.g., a metric exceeding a threshold), remediation script 316 may execute within a restricted execution context 306 that enforces any permission limitations of remediation script 316, such as by preventing access or modification to files and/or commands based on permission requirements indicated in install specification file 310. Remediation script 316 may utilize libraries such as remediation libraries 222 and alarm libraries 220 that are loaded into restricted execution context 306. Remediation script 316 may perform one or more remedial operations to prevent or discontinue an abnormal condition. For example, remediation script 316 may restart a VCI running on the host based on a determination that a memory utilization of the VCI has exceeded a threshold for given length of time.

It is noted that while certain embodiments of the present disclosure are described with respect to virtual components (e.g., VCIs), techniques described herein may also be implemented with physical components.

Figure 4:
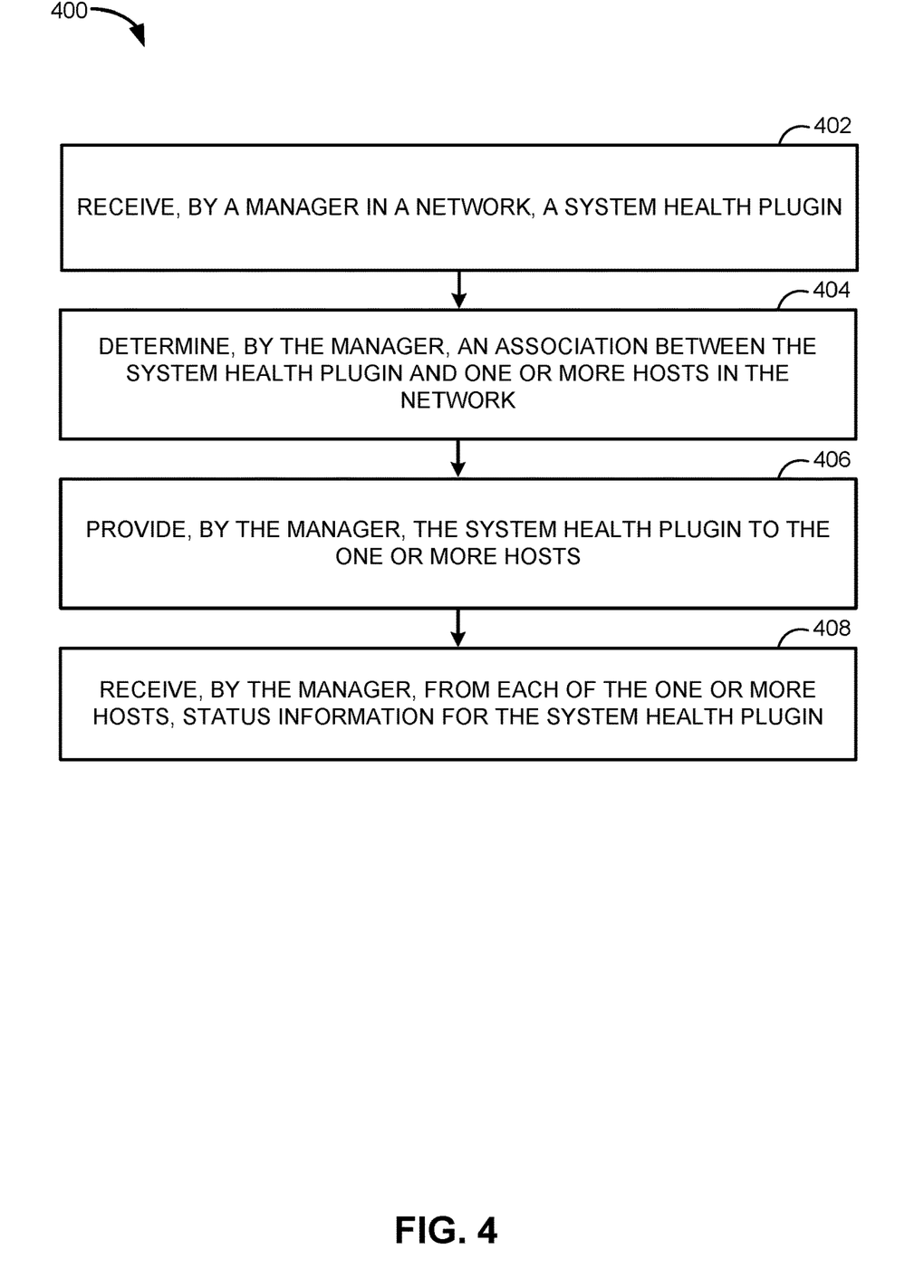
FIG. 4 depicts example operations for dynamic plugin management according to embodiments of the present disclosure.

FIG. 4 depicts example operations 400 for dynamic plugin management according to embodiments of the present disclosure. For example, operations 400 may be performed by manager 138 of FIG. 1.

At 402, a manager in a network receives a system health plugin. For example, an administrator may upload an archive file for the system health plugin to manager 138 of FIG. 1.

At 404, the manager determines an association between the system health plugin and one or more hosts in the network. The association may be determined based on the one or more hosts satisfying one or more conditions For example, the administrator may define a host group using a logical expression (e.g., specifying one or more conditions for membership in the host group), and may associate the system health plugin with the host group. Manager 138 of FIG. 1 may therefore determine that the system health plugin is associated with each host that meets the one or more conditions specified in the definition of the host group.

At 406, the manager provides the system health plugin to the one or more hosts. For example, manager 138 of FIG. 1 may provide the system health plugin to the one or more hosts in the host group via controller 136 of FIG. 1 for installation in a system health agent on each of the one or more hosts.

At 408, the manager receives, from each of the one or more hosts, status information for the system health plugin. The status information may, for example, indicate whether the system health plugin was properly installed on a given host and a profile that was used to configure the system health plugin on the given host. The manager may receive status information from each of the one or more hosts on an ongoing basis, such as each time there is a delta change to the execution status or configuration of the system health plugin on one of the hosts.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and/or the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) --CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system (OS) in which at least one application runs. It should be noted that these embodiments may also apply to other examples of contexts, such as containers not including a guest operating system, referred to herein as "OS-less containers". OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block input/output (I/O), network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of providing an extendable system health management framework in a network, comprising:
receiving, by a manager, a system health plugin;
determining, by the manager, a first association between the system health plugin and a first host in the network based on the first host satisfying a first one or more conditions;
determining, by the manager, a second association between the system health plugin and a second host in the network based on the second host satisfying a second one or more conditions;
providing, by the manager, the system health plugin to the first host for installation in a first system health agent on the first host, wherein the system health plugin is dynamically configured on the first host based on a first profile associated with the first host, and wherein the first profile indicates one or more configuration values with which the system health plugin is to be configured on hosts satisfying the first one or more conditions;
providing, by the manager, the system health plugin to the second host for installation in a second system health agent on the second host, wherein the system health plugin is dynamically configured on the second host based on a second profile associated with the second host, and wherein the second profile indicates one or more alternative configuration values with which the system health plugin is to be configured on hosts satisfying the second one or more conditions; and
receiving, by the manager, from the first host and the second host, status information for the system health plugin.

2. The method of claim 1, wherein the system health plugin comprises an archive file that includes one or more of:
an installation specification file;
a profile file; or
a script.

3. The method of claim 1, wherein determining, by the manager, the first association between the system health plugin and the first host in the network comprises determining that an association has been defined between the system health plugin and a host group, wherein membership in the host group is based on the first one or more conditions.

4. The method of claim 3, wherein the first one or more conditions are defined using a logical expression indicating one or more of:
a host type;
a tag;
a logical entity; or
another host group.

5. The method of claim 1, wherein receiving, by the manager, from the first host and the second host, the status information for the system health plugin comprises one or more of:
receiving an indication of whether the system health plugin was properly installed on the first host or the second host; or
receiving an indication of which profile was used to configure the system health plugin on the first host or the second host.

6. The method of claim 1, further comprising:
receiving, by the manager, the first profile associated with the first host, wherein the first profile is a customized profile for the system health plugin that is specific to the first host; and
providing, by the manager, the first profile to the first host.

7. The method of claim 6, wherein receiving, by the manager, from the first host and the second host, the status information for the system health plugin comprises receiving an indication that the first profile was used to configure the system health plugin on the first host.

8. The method of claim 1, further comprising validating, by the manager, the system health plugin using one or more keys, wherein the manager provides the system health plugin to the first host and second host via one or more secure channels.

9. A non-transitory computer readable medium comprising instructions that, when executed by one or more processors of a computing system, cause the computing system to perform a method of providing an extendable system health management framework in a network, the method comprising:
receiving, by a manager, a system health plugin;
determining, by the manager, a first association between the system health plugin and a first host in the network based on the first host satisfying a first one or more conditions;
determining, by the manager, a second association between the system health plugin and a second host in the network based on the second host satisfying a second one or more conditions;
providing, by the manager, the system health plugin to the first host for installation in a first system health agent on the first host, wherein the system health plugin is dynamically configured on the first host based on a first profile associated with the first host, and wherein the first profile indicates one or more configuration values with which the system health plugin is to be configured on hosts satisfying the first one or more conditions;

providing, by the manager, the system health plugin to the second host for installation in a second system health agent on the second host, wherein the system health plugin is dynamically configured on the second host based on a second profile associated with the second host, and wherein the second profile indicates one or more alternative configuration values with which the system health plugin is to be configured on hosts satisfying the second one or more conditions; and receiving, by the manager, from the first host and the second host, status information for the system health plugin.

10. The non-transitory computer readable medium of claim 9, wherein the system health plugin comprises an archive file that includes one or more of:
an installation specification file;
a profile file; or
a script.

11. The non-transitory computer readable medium of claim 9, wherein determining, by the manager, the first association between the system health plugin and the first host in the network comprises determining that an association has been defined between the system health plugin and a host group, wherein membership in the host group is based on the first one or more conditions.

12. The non-transitory computer readable medium of claim 11, wherein the first one or more conditions are defined using a logical expression indicating one or more of:
a host type;
a tag;
a logical entity; or
another host group.

13. The non-transitory computer readable medium of claim 9, wherein receiving, by the manager, from the first host and the second host, the status information for the system health plugin comprises one or more of:
receiving an indication of whether the system health plugin was properly installed on the first host or the second host; or
receiving an indication of which profile was used to configure the system health plugin on the first host or second host.

14. The non-transitory computer readable medium of claim 9, wherein the method further comprises:
receiving, by the manager, the first profile associated with the first host, wherein the first profile is a customized profile for the system health plugin that is specific to the first host; and
providing, by the manager, the customized profile to the first host.

15. The non-transitory computer readable medium of claim 14, wherein receiving, by the manager, from the first host and the second host, the status information for the system health plugin comprises receiving an indication that the first profile was used to configure the system health plugin on the first host.

16. The non-transitory computer readable medium of claim 9, wherein the method further comprises validating, by the manager, the system health plugin using one or more keys, wherein the manager provides the system health plugin to the first host and the second host via one or more secure channels.

17. An apparatus for providing an extendable system health management framework in a network, the apparatus comprising:
a communication module configured to:
receive a system health plugin;
provide the system health plugin to a first host, based on a first association between the system health plugin and the first host, for installation in a first system health agent on the first host, wherein the system health plugin is dynamically configured on the first host based on a first profile associated with the first host, and wherein the first profile indicates one or more configuration values with which the system health plugin is to be configured on hosts satisfying a first one or more conditions;
provide the system health plugin to a second host, based on a second association between the system health plugin and the second host, for installation in a second system health agent on the second host, wherein the system health plugin is dynamically configured on the second host based on a second profile associated with the second host, and wherein the second profile indicates one or more alternative configuration values with which the system health plugin is to be configured on hosts satisfying a second one or more conditions; and
receive, from the first host and the second host, status information for the system health plugin; and
a processing module configured to:
determine the first association between the system health plugin and the first host based on the first host satisfying the first one or more conditions; and
determine the second association between the system health plugin and the second host in the network based on the second host satisfying the second one or more conditions.

18. The apparatus of claim 17, wherein the system health plugin comprises an archive file that includes one or more of:
an installation specification file;
a profile file; or
a script.

19. The apparatus of claim 17, wherein determining the first association between the system health plugin and the first host comprises determining that an association has been defined between the system health plugin and a host group, wherein membership in the host group is based on the first one or more conditions.

20. The apparatus of claim 19, wherein the first one or more conditions are defined using a logical expression indicating one or more of:
a host type;
a tag;
a logical entity; or
another host group.

* * * * *